Figure 1:
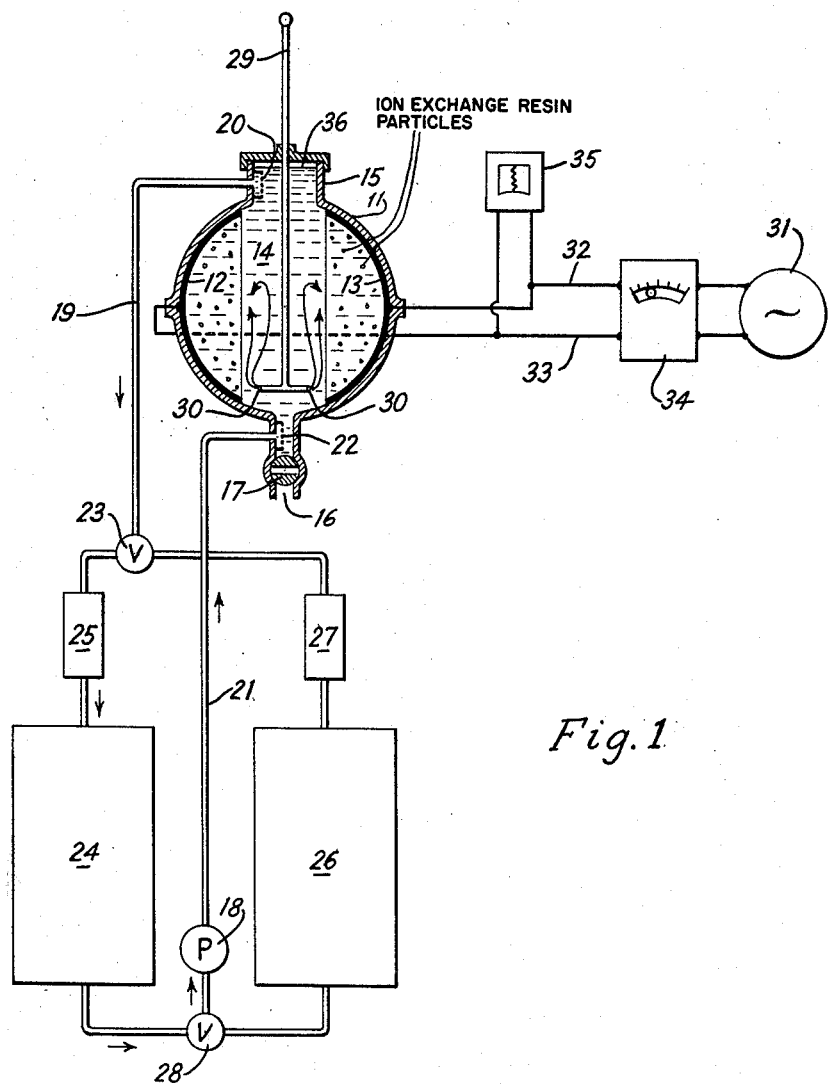

April 27, 1965   P. KOLLSMAN   3,180,815
METHOD OF PRODUCING ION EXCHANGE FILLER PARTICLES
OF HIGH ELECTRICAL CONDUCTIVITY
Filed Sept. 9, 1960   2 Sheets-Sheet 2

INVENTOR.
Paul Kollsman
BY Howard S. Russell
his ATTORNEY

United States Patent Office 3,180,815
Patented Apr. 27, 1965

3,180,815
METHOD OF PRODUCING ION EXCHANGE FILLER PARTICLES OF HIGH ELECTRICAL CONDUCTIVITY
Paul Kollsman, 100 E. 50th St., New York, N.Y.
Filed Sept. 9, 1960, Ser. No. 54,948
9 Claims. (Cl. 204—131)

Particles of synthetic resin ion exchange material, which may have the form of beads, granules, or fibers, are used in electrodialysis apparatus for a variety of purposes, for example to improve the electrical conductance of the entire apparatus, or at least of the dilution compartments, to reduce the effects of polarization, to fractionate liquid mixtures of poor or zero conductivity, and for other purposes.

The present invention is based on my discovery that the conductivity of resinous ion exchange particles can be improved materially by passing an electric current through the resinous material, preferably in different directions simultaneously or successively and under electric current/temperature conditions beyond the yield point of the material, as herein defined.

The electrical conductivity of resinous ion exchange materials is the result of the microporous structure of the material whose pores are filled with a liquid of a relatively high ionic concentration. Portions of the pores may be so narrow as not to accommodate mobile ions with their solvent shells, particularly within the range of low ionic concentrations in which the solvent shell of each ion is relatively large. Thus narrow pore portions contribute to high electrical resistance of the pore passages.

The invention provides a method of enlarging the pores of the ion exchange material. The invention is based, in part, on the phenomenon that physical conditions can be provided under which the material yields, so as to permit dilation of the passages, and that the dilation may be made permanent.

It is known that the physical strength of synthetic resins decreases suddenly at the yield point so that, for example, a substantial elongation of the material may be produced by little or no increase in load beyond a certain point. Furthermore, it is known that the yield point may be lowered by heating of the material.

Heating of ion exchange materials for treatment according to the invention may be accomplished by heating of the liquid in which the material is immersed or by heating of the material proper incidental to the passage of an electric current therethrough.

The yield point may also be lowered by the presence of a resin matrix softening solvent in the resin, or the addition of such solvent to the resin, and the yield point may subsequently be raised by removal of at least a portion of such solvent from the material.

According to the invention an electric current is passed through the material preferably in several angularly related directions, in view of the generally random disposal of the pore passages.

A strong electric current flowing as a result of a potential applied to two or more spaced electrodes has a dilating effect on the passages. Narrow pore passage portions become enlarged by the pressure of the ions under the influence of the applied potential. Pore enlargement takes place if the current is strong enough, or the material weak enough to deform under the ionic pressure.

In my copending application serial No. 54,936, filed September 9, 1960, I explained how the yield point of an ion exchange membrane may be determined. Briefly, if a constant current is passed through the membrane, and the material is heated gradually, the potential to maintain a pre-set current gradually decreases and, if plotted, produces a curve of substantially even slope until a point is reached where the required potential decreases far more than is expected by a projection of the curve. This point I have termed yield point for the purpose of this invention. At the yield point the resistivity of the material decreases disproportionately.

I also explained in said copending application that the yield point conditions may be ascertained most conveniently, and without elaborate material testing, by placing the material between two test electrodes to which a constant potential is applied, producing a test current of a certain magnitude, say 3 or 5 ma. If the yield point is exceeded during treatment of the material, the test current suddenly increases to 7, 8, or more ma., which is particularly noticeable if a recording milliammeter is employed. Operation above the yield point is thus ascertainable without the necessity of measuring the treatment temperature or the treatment current in particular. This will also be explained hereinafter in detail.

Filler material may be treated in an electric direct or alternating field. The material may be at rest and the direction of the field may shift. This may conveniently be accomplished by placing the material between several electrodes connected to a 3-phase source of current.

On the other hand, the direction of the field may remain the same, and the disposition of the material with respect to the field may change, for example by stirring the filler particles in a volume of liquid in which they are disposed.

Finally, the particles may be agitated and the direction of the field may be varied in addition.

The yield point may be exceeded by the heating, and thereby weakening, of a heat softenable material and the resultant improvement in electrical conductivity may be made permanent by the subsequent hardening of the material in its improved state. This may be accomplished by cooling, or by additional polymerization, copolymerization, or additional crosslinking, all of which tend to harden the material.

The yield point may also be temporarily lowered for the treatment by absorption into the resin of a small amount of a matrix solvent, which is removed during the treatment by heat or leaching by the ionic treatment solution, or which is removed after treatment by drying or otherwise.

The resinous material may in the course of its manufacture be in a condition above the yield point, for example while being liquid or semiplastic prior to its first solidification by cooling, matrix solvent removal, crosslinking, polymerization or otherwise. In that case, it is sufficient to apply the electric current treatment while the material passes through the yield point condition into a more solidified state. Comparative tests of treated and non-treated material will then show that the treated material has a lower resistivity.

The various aims, objects and advantages of this invention will appear more fully from the detailed description which follows, accompanied by drawings showing, for the purpose of illustration, how the invention may be carried out.

Figure 2:
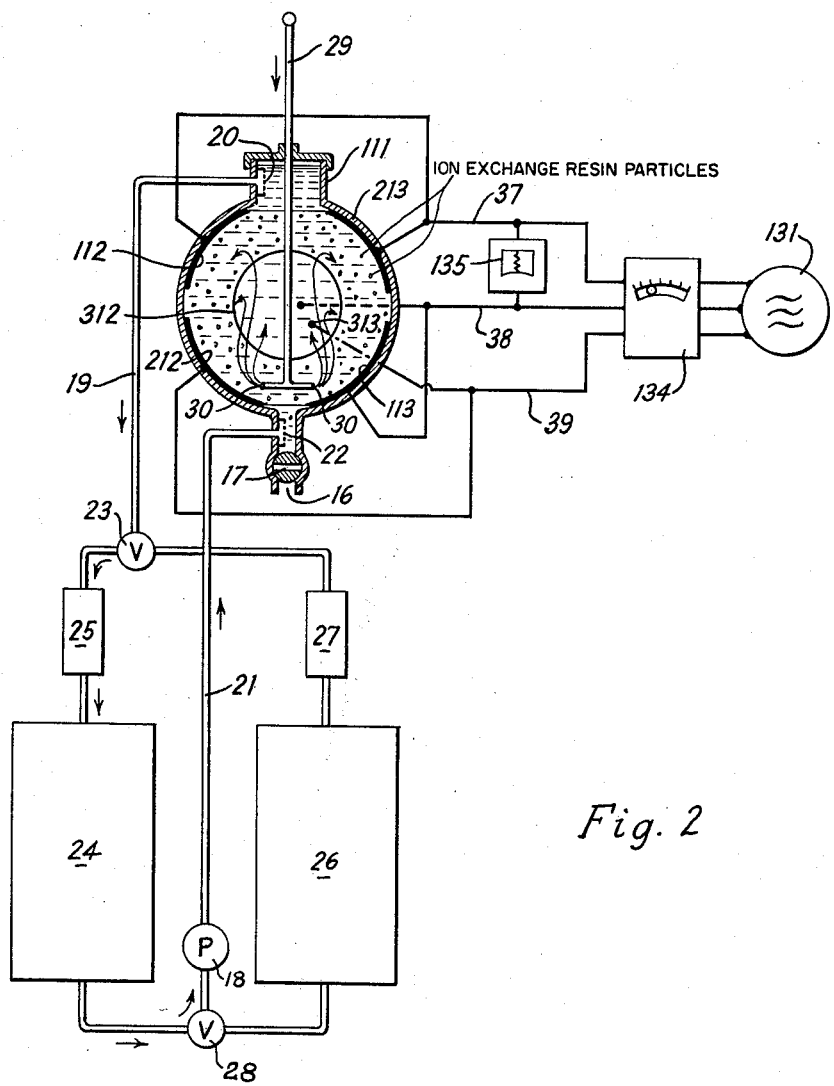

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

FIG. 1 is a diagammatic illustration of an apparatus for treating ion exchange resin particles in accordance with this invention; and FIG. 2 illustrates a modification of the apparatus of FIG. 1 to employ three sets of electrodes to produce electric fields in three directions substantially normal to one another.

In the following description and in the claims various details will be identified by specific names for convenience. The names, however, are intended to be generic in their application. Corresponding reference characters refer to corresponding parts in the several figures of the drawings.

The following description discloses certain specific details of the invention for the purpose of explanation of its broader aspects, but it is understood that details may be modified in various respects without departure from the principles of the invention and that the invention may be practiced by other devices than shown.

The apparatus shown in FIG. 1 comprises a substantially spherical vessel 11 containing a pair of internal electrodes 12 and 13 and a charge of ionic liquid 14 which may be filled into the vessel through a neck 15 and be withdrawn through a bottom duct 16 equipped with a valve 17.

The electrolyte 14 may be circulated continuously by a pump 18 withdrawing liquid through a withdrawal duct 19 fitted with a screen 20 and be returned through a return duct 21 fitted with a similar screen 22.

Withdrawn liquid may be directed by a valve 23 either into a storage tank 24 for heated electrolyte via a controlled heater 25 or into a second storage tank 26 containing cooled electrolyte via a cooling unit 27. A further control valve 28 which may be of the mixing type supplies either heated or cooled electrolyte or a mixture to the pump.

A compressed air duct 29 extends into the vessel 11 and discharges compressed air through nozzles 30 near the bottom of the vessel for the purpose of agitating the contents. Obviously, mechanical stirring means may be employed instead.

A generator 31 of either direct current or alternating current applies an electrical potential to the electrodes 12 and 13 through leads 32 and 33 and the current flowing through the leads is controlled by a presettable current regulator 34. A voltmeter 35, preferably of the recording type, measures the potential applied to the electrodoes 12 and 13.

The vessel is normally filled to a level 36 with a mixture of ion exchange particles and electrolytes and the particles are maintained in a state of agitation by mechanical stirring. At the start of the treatment warm electrolyte is present in the vessel and the temperature of the electrolyte is gradually increased until the voltmeter 35 records a sudden drop in the voltage required to maintain the preset current as a result of a sudden increase in conductivity of the ion exchange particles floating in the electrolyte. This is the indication that the yield point of the particles is exceeded.

The treatment is then continued at the same or higher temperature until no appreciable further improvement is noted by observation of the voltmeter. The heated electrolyte is then replaced by cooled electrolyte to set or harden the particles, but the flow of current is preferably maintained during the cooling period to maintain the pores in their dilated condition during setting of the material. Setting of the ion exchange material may also occur in the presence of heated electrolyte by progressive polymerization, copolymerization or crosslinking of the material, whereafter the material is cooled. Setting may also occur by removal of matrix solvent by boiling it out by a heated electrolyte.

The ionic concentration of the electrolyte may vary depending on the results desired. Highly concentrated ionic solutions of the order of 5 N. to saturated KCl solution in water produces particles of relatively small pore size, low pore liquid content, great mechanical strength and high ionic selectivity while low ionic concentrations such as 0.5 N. NaCl solution, preferably of exchangeable ions of low mobility, produces open pored particles having a high liquid pore content and lower mechanical strength.

The apparatus shown in FIG. 2 corresponds to that of FIG. 1, except that the vessel is fitted with three pairs of electrodes 112, 113; 212, 213 and 312, 313 supplied through leads 37, 38, 39 with current generated by a three-phase generator 131 and controlled by a current regulator 134. The recording or indicating voltmeter 36 may be connected to any two leads, for example leads 37, 38, as shown. Lead 37 extends to electrodes 112, 213, lead 38 to electrodes 312, 113, and lead 39 to electrodes 212 and 313, the latter lying above the plane of section for which reason the lead line is shown as a dash dot line and only the point of connection is indicated at 313.

In the operation the direction of the field changes in accordance with the frequency of the current which may be 60 c. or less.

*Examples*

*Example 1a.*—A mixture of 20 parts of quaternized polystrene, 20 parts of sulfonated polystyrene, 60 parts of Dynel, 3 parts of divinyl benezene and ½ part of dicumyl peroxide (all by weight) were dissolved in sufficient dimethyl formamide to produce a highly viscous solution at 80° C.

Droplets of the solution were formed at 80° C. and solidified by drying in hot air at about 95° C. for 6 hours to cause appreciable crosslinking within the droplets. The cooled particles were then activated by successive immersion in aqueous 1 N. KOH, 1 N. HCl and 2 N. LiF and 0.3 N. LiF solution at 80° C.

The resultant particles were first dipped in dimethyl formamide until they absorbed enough solvent to become appreciably softer, and then were placed in the apparatus of FIG. 2 in a charge of aqueous 0.3 N. LiF solution of pH 5. The charge was maintained under pressure of 10 atm. Three-phase current was passed through the charge which was being agitated by compressed air. The current density was adjusted to the maximum obtainable by the apparatus which was about 500 ma./cm.$^2$ of the electrode surface. The temperature of the particle and liquid charge rose gradually as a result of the current passing therethrough, and the voltmeter was observed for non-uniformity in the rate of voltage decline. After the point was reached, the temperature was permitted to increase about 15° C. The particles were thereafter cooled by flow of cooled electrolyte therethrough, the flow of current and agitation was discontinued and the charge removed.

1 cm.$^3$ of the particles was placed between test electrodes in 0.02 N. NaCl solution and the resistance measured.

Results:

| Untreated, ohms | Current treated, ohms |
|---|---|
| 280 | 125 |

*Comment.*—During treatment the matrix solvent dimethyl formamide was leached out from the particles by the aqueous LiF solution, thereby raising the yield point towards the end of the treatment.

*Example 1b.*—Beads were prepared from a highly viscous mixture of 100 parts of commercial polyethylene of high density and molecular weight greater than 50,000, 25 parts of the propylester of polystyrene sulfonic acid, 25 parts of the proprionate of quaternized polystyrene, both styrene compounds being of a molecular weight greater than 50,000, and ½ part of benzophenone and enough toluene to form a highly viscous compound mixture at 95° C.

Droplets of the solution were formed and solidified to form beads by drying. The beads were then exposed to irradiation by ultraviolet germicidal rays to cause crosslinking within the bead material, whereby the beads became substantially insoluble in toluene. The beads were then activated by successive immersion in aqueous solution of 1 N. HCl, 1 N. NaOH, 2 N. LiF at 80° C.

The beads were then treated and tested as in Example 1a, but without a matrix solvent.

Results:

| Untreated, ohms | Current treated, ohms |
|---|---|
| 235 | 95 |

*Example 2.*—Beads were formed from a saturated mixture of 40 parts sulfonated polystyrene and 60 parts Dynel in solution of N. dimethyl formamide saturated at 70° C.

The treatment corresponded to that of Example 1 except that the electrolyte was an aqueous 1.5 N. solution of KCl and a current density of about 600 ma. was employed.

Results of test of the beads in aqueous 0.02 N. NaCl solution:

| Untreated, ohms | Current treated, ohms |
|---|---|
| 215 | 105 |

*Example 3a.*—Synthetic resin beads were made, treated and tested, particulars being as follows:

The beads were made from a mixture of 60 parts propylester of styrene sulfonic acid, 395 parts divinyl benzene and 0.5 part benzoyl peroxide by suspension polymerization until the particles formed a soft solid of about 1 to 2 percent crosslinking. The beads were activated in aqueous 1 N. KOH and equilibrated in aqueous 1 N. KCl. The soft incompletely crosslinked beads were treated by 60 c. current in the apparatus of FIG. 2 in a state of agitated suspension in 1 N. NaCl in water solution at a mean current density of 600 ma. under atmospheric pressure. The temperature of the charge was gradually raised by inflow of hot electroylte into the treatment chamber until a break in the voltage curve indicated a sudden change in resistivity due to a conditioin of the resinous matrix beyond the yield point. The temperature increase was continued until the disproportionate potential decrease became noticeably smaller.

The charge was maintained at that condition for 24 hours during which time the beads hardened as a result of further crosslinking. The charge was then cooled, current discontinued and the beads removed.

The beads were tested by 60 c. current in aqueous 0.02 N. NaCl solution for resistance. 1 cm.³ of beads between test electrodes gave the following figures.

| Untreated, ohms | Current treated, ohms |
|---|---|
| 130 | 70 |

The untreated comparison charge was likewise kept in heated electrolyte for 24 hours, but without passage of current therethrough.

*Example 3b.*—The test 3a was repeated in the apparatus of FIG. 1 with a source of direct current of 175 ma.

Results:

| Untreated, ohms | Current treated, ohms |
|---|---|
| 130 | 85 |

*Example 4.*—Beads were formed of 45 parts polymers of propylester of styrene sulfonic acid, 50.5 parts styrene, 4 parts divinyl benzene and 0.5 part benzoyl peroxide. Droplets of the resultant mixture of the aforespecified substances were dropped into a stirred bath of 80° C. of water containing 0.1% hydroxy ethyl cellulose in order to polymerize the beads.

The treatment data were identical with those of Example 3a. The apparatus of FIG. 2 was used. 1 cm.³ of beads tested in 0.02 N. NaCl were found to have the following resistance:

| Untreated, ohms | Current treated, ohms |
|---|---|
| 115 | 80 |

*Example 5.*—Beads were prepared from 45 parts of propylester of styrene sulfonic acid, 45 parts styrene, 9.5 parts divinyl benzene, 0.5 part benzoyl peroxide.

The treatment took place in the apparatus of FIG. 1 and the data corresponded to those of Example 3a except that the electrolyte consisted of aqueous 0.9 N. $(CH_3)_4NCl$. Mean current density 400 ma./cm.².

Results: 1 cm.³ of beads immersed in aqueous 0.02 N. NaCl solution had the following resistances:

| Untreated, ohms | Current treated, ohms |
|---|---|
| 185 | 100 |

*Example 6.*—Amphoteric beads were prepared as follows:

Anionogenic constituent: mixture of 1 mol 2 vinyl pyridine and 1 mol dimethyl sulfate reacted at 65° and permitted to cool.

Cationogenic constituent: propylester of styrene sulfonic acid.

A first compound was prepared from one part of anionogenic constituent, one part of styrene, one-half part of divinyl benzene, and 0.5 percent (by volume of the total) of benzoyl peroxide, by mixing and heating to 65° C. while stirring until the liquid thickens to a point short of forming a gel at which point it is cooled to retard further crosslinking. The resultant viscous liquid is mixed immediately with a compound B prepared as follows.

Compound B was prepared from one part of cationogenic constituent, 1 part of styrene, one-half part of divinyl benzene and 0.5 percent (by volume of the total) of benzoyl peroxide, by mixing and heating to 65° C. under stirring until the liquid reached a point short of forming a gel. At this point the liquid was cooled and combined with compound A in equal proportions, heated to 65° C. and formed into droplets which were dropped into a stirred bath of 80° C. of water containing 0.1 percent hydroxyethyl cellulose.

The beads were then activated by successive immersion in aqueous 1 N. HCl, 2 N. LiOH, 2 N. LiF and 0.2 N. LiF.

Treatment data identical with those in Example 3a except that apparatus FIG. 1 was used.

Results: 1 cm.³ of beads tested in 0.02 N. NaCl in water showed the following resistances.

| Untreated, ohms | Current treated, ohms |
|---|---|
| 230 | 95 |

*Example 7.*—Beads were prepared from polyethylene by different degrees of irradiation by X-rays all sufficient to produce insolubility in benzene. The beads were soaked in styrene at 80° C. for 6 hours, then sulfonated by treatment with sulfonic acid at 80° C. for 6 hours and finally immersed successively in aqueous solutions of 1 N. HCl, 1 N. NaOH and 1 N. NaCl.

The activated beads were then treated in the apparatus of FIG. 3, the treatment data being the same as in Example 1 except the solution was 0.3 N. NaCl in water.

Results: 1 cm.³ of beads in aqueous 0.02 N. NaCl gave the following resistance readings:

| Untreated, ohms | Current treated, ohms |
|---|---|
| 190 | 75 |

*Example 8.*—Beads were prepared from polyethylene irradiated by X-rays to a degree sufficient to product insolubility in benzene. The beads were heated for 6 hours in chloromethyl ether containing 1% zinc chloride catalyst at 50° C. The chloromethylated beads were washed successively in dioxane, water, dilute HCl, and water.

The beads were next immersed in a mixture of 2 parts dioxane, 2 parts water and 1 part trimethylamine (by volume) at a temperature of 80° C.

The beads were then successively immersed in 1 N. HCl, 2 N. NaF and 0.5 N. NaF.

The activated beads were subsequently treated in the apparatus, FIG. 3, the treatment data being the same as in Example 1 except that the treatment was carried out at normal atmospheric pressure and the treatment solution was a mixture of 1 N. NaF in water with enough ethylene glycol added to produce a boiling point of 130° C.

The beads were finally washed in aqueous 1 N. NaCl solution.

Results: 1 cm.³ in aqueous 0.02 N. NaCl gave the following resistance readings:

| Untreated, ohms | Current treated, ohms |
|---|---|
| 155 | 60 |

It is evident that the yield point condition need be determined only once for a certain material so that additional quantities of the material may be treated by simply repeating the operating conditions previously ascertained.

The present method is applicable to a wide variety of ion exchange materials which may be shaped into bead form. Representative materials are disclosed in South African Patents 1900/57 (AMF), 1202/55 (TNO), United States patents to Graydon No. 2,877,191, Clarke No. 2,730,768, and an article by Whetstone, Gregor et al. in the Journal of Physical Chemistry, pp. 141, 147 and 151 (February 1957).

The above mentioned materials may be formed into bead or other particle shape.

What is claimed is:

1. Method of producing a permanent increase in electrical conductivity in particles of synthetic resinous ion exchange material, the method comprising, subjecting said particles while immersed in a liquid electrolyte to an electric current passing through said electrolyte, varying the relative orientation of the direction of the current with respect to said particles to produce flows of electric current through said particles which are directed at an angle with respect to one another; and maintaining the material during passage of electric current therethrough, at least for a period of time, in a condition above its yield point in relation to the magnitude of the electric current being passed therethrough.

2. Method of producing a permanent increase in electrical conductivity in particles of synthetic resinous ion exchange material, the method comprising passing an electric current through said particles while immersed in a liquid electrolyte, varying the angular direction of the electric current with respect to said particles, and maintaining the material in a condition beyond its yield point in relation to the magnitude of the electric current at least during a portion of the time of passage of electric current through the material.

3. Method of producing a permanent increase in electrical conductivity in particles of resinous synthetic ion exchange material, the method comprising, immersing said particles in an ionic liquid; passing an electric current through said liquid and said particles therein, changing the relative orientation of the electric current with respect to said particles to cause passage of electric current through the particles in at least two angularly related directions, while maintaining, at least for a portion of the time of passage of electric current through the particles, the said material in a condition above the yield point of the material in relation to the magnitude of the applied current.

4. Method of producing a permanent increase in electrical conductivity in particles of resinous ion exchange material, the method comprising, immersing said particles in an electrolyte between electrodes; agitating said particles so as to vary their orientation with respect to an electric field established between the electrods; and applying an electrical potential to said electrodes to pass an electric current through said electrolyte and said particles while maintaining the particles, at least during a portion of the time of passage of current therethrough, in a condition above the yield point of the material in relation to the magnitude of the applied current.

5. Method of producing a permanent increase in electrical conductivity in particles of resinous ion exchange material, the method comprising, immersing said particles in an electrolyte between electrodes; agitating said particles so as to vary their orientation with respect to an electric field established between the electrodes; and applying an electrical potential to said electrodes to pass an electric current through said electrolyte and said particles while maintaining the particles, at least during a portion of the time of passage of current therethrough, at a temperature above the yield point of the material in relation to the magnitude of the applied current.

6. Method of producing a permanent increase in electrical conductivity in particles of resinous ion exchange material, the method comprising, subjecting said particles to an electric field while said particles are immersed in a liquid electrolyte; varying the orientation of the field with respect to the particles therein to produce flows of electric current through the said electrolyte and said particles in angularly different directions; and maintaining said particles, at least for a portion of the period of passage of electric current through the particles, at a temperature/electric current condition above the yield point of the material.

7. Method of producing a permanent increase in electrical conductivity in particles of resinous synthetic ion exchange material, the method comprising, immersing said particles in an ionic liquid between electrodes; applying an electrical potential to the electrodes of a magnitude and for a period sufficient to exceed the yield point of the material to produce a substantially immediate change in conductivity of said particles, said change being ascertainable by an increase in the current passing between the electrodes without an equivalent increase in the potential; maintaining, at least for a portion of the time of passage of the electric currrent through said particles, said material in its condition above its yield point; and agitating the particles so as to change the orientation of the particles with respect to the electrical field during passage of current through said particles.

8. The method of producing a permanent increase in electrical conductivity in particles of resinous ion exchange material containing a matrix softening solvent, the method comprising, immersing said particles in an electrolyte between electrodes; applying an electrical potential to said electrodes of a magnitude producing a substantially abrupt change in the conductivity of said particles, said change being ascertainable by an increase in the current passing between the electrodes without an equivalent increase in the potential; maintaining the potential at at least said magnitude while agitating said particles, so as to vary their orientation with respect to the electric field established between the electrodes; and removing at least a portion of said matrix softening solvent to harden said particles while maintaining said particles subject to said electric field and agitation.

9. The method of producing a permanent increase in electrical conductivity in particles of resinous ion exchange material containing a matrix softening solvent, the method comprising, immersing said particles in an electrolyte between electrodes; applying an electrical potential to said electrodes of a magnitude producing a substantially abrupt change in the conductivity of said particles, said change being ascertainable by an increase in the currrent passing between the electrodes without an equivalent increase in the potential; maintaining the potential at at least said magnitude while varying the orientation of the field with respect to the particles therein to produce flows of electric currrent through said particles in angularly different directions; and removing at least a portion of said matrix softening solvent to harden said particles while maintaining said particles subject to said electric field while the field continues changing its orientation with respect to the particles.

References Cited by the Examiner
UNITED STATES PATENTS 2,812,300   2/56   Pearson _____ 204—131

FOREIGN PATENTS 675,253   7/52   Great Britain.

JOHN H. MACK, *Primary Examiner.*

JOHN R. SPECK, MURRAY TILLMAN, *Examiners.*